United States Patent
Quan et al.

(10) Patent No.: US 12,055,955 B2
(45) Date of Patent: Aug. 6, 2024

(54) FLOW CONTROL SYSTEM FOR DIGITAL AND MECHANICAL REDUNDANT PRESSURE COMPENSATION

(71) Applicant: Taiyuan University of Technology, Taiyuan (CN)

(72) Inventors: Long Quan, Taiyuan (CN); Bin Zhao, Taiyuan (CN); Jing Yang, Taiyuan (CN); Lei Ge, Taiyuan (CN); He Liu, Taiyuan (CN); Yunxiao Hao, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 54 days.

(21) Appl. No.: 17/984,696

(22) Filed: Nov. 10, 2022

(65) Prior Publication Data

US 2023/0266777 A1    Aug. 24, 2023

(30) Foreign Application Priority Data

Nov. 11, 2021   (CN) .......................... 202111331791.2

(51) Int. Cl.
*G05D 16/16*    (2006.01)
*F15B 11/16*    (2006.01)
*G05D 16/00*    (2006.01)

(52) U.S. Cl.
CPC ........... *G05D 16/16* (2013.01); *G05D 16/028* (2019.01)

(58) Field of Classification Search
CPC ....... G05D 16/16; G05D 16/028; F15B 11/16; F15B 13/06; F15B 20/00; F15B 2211/6309
See application file for complete search history.

(56) References Cited

U.S. PATENT DOCUMENTS

| 2006/0191262 | A1* | 8/2006 | Jackson | ............... G05D 16/208 |
| | | | | 60/452 |
| 2021/0372088 | A1* | 12/2021 | Shimada | ................. F15B 21/14 |

* cited by examiner

*Primary Examiner* — Paul J Gray
(74) *Attorney, Agent, or Firm* — IP Attorneys Group, LLC

(57) ABSTRACT

Disclosed is a flow control system for digital and mechanical redundant pressure compensation. On the basis of an original pressure compensation valve, two-position three-way electromagnetic valves are added to control the opening and closing of pressure compensation valves. Furthermore, pressure sensors and a controller are added, so that the system has a digital pressure compensation function. When the pressure sensor breaks down, the flow control system is switched to a mechanical compensation mode to achieve mechanical pressure compensation, the problem that system flow cannot be controlled when the sensor breaks down is solved, and the purpose of redundancy control is achieved. Moreover, the pressure compensation valve in the loop where the highest load is located can be controlled to be completely opened through the two-position three-way electromagnetic valve to reduce pressure loss of the valve port, and the pressure is not affected by load fluctuation.

6 Claims, 2 Drawing Sheets

FLOW CONTROL SYSTEM FOR DIGITAL AND MECHANICAL REDUNDANT PRESSURE COMPENSATION

CROSS-REFERENCE TO RELATED APPLICATION

This application claims priority to Chinese Patent Application No. 202111331791.2, filed on Nov. 11, 2021, which is hereby incorporated by reference in its entirety.

TECHNICAL FIELD

The present disclosure relates to the technical field of flow control, in particular to a flow control system for digital and mechanical redundant pressure compensation.

BACKGROUND

In order to restrict influence of load change on the flow, the traditional electro-hydraulic proportional flow valve utilizes a pressure compensation valve to keep the pressure difference between the inlet and outlet of the valve being constant. However, such method may add additional pressure loss. Furthermore, the delay of the pressure signal transmitted by the detection pipeline causes the system response to lag behind, so that the stability is affected. Further, the multi-actuator system with pressure compensation valve is affected by factors such as load fluctuation, and the pressure compensation valve in the loop where the highest load pressure is located still may be throttled, resulting in energy waste. Moreover, when the oil supply flow of the system is less than the required low, the pressure compensation valve is invalid, and the system flow cannot be accurately distributed.

In order to solve the problem of pressure difference loss, a flow control method calculating flow feedback is adopted in the prior art. The pressure sensor and displacement sensor detect the pressure before and after the now valve and the displacement of the valve core, and input the detected values into the controller. The controller calculates the now passing through the valve according to the set algorithm, and the calculated flow is compared with the given flow. In this flow control method, a control closed loop is formed by using a regulator, and the valve core displacement control signal is adjusted in real time to compensate the influence of the flow valve pressure difference change on the output flow. However, when the pressure sensor or the matched measuring amplifier breaks down, the flow valve cannot compensate pressure to lose the stable control of the flow, especially in the case that the flow valve is applied to composition actions of multiple actuating elements, resulting in inaccurately distributed flow and easily causing the accident that the equipment is out-of-control.

SUMMARY

The present disclosure aims to provide a flow control system for digital and mechanical redundant pressure compensation. The flow control system has the functions of digital pressure compensation and mechanical pressure compensation. The pressure compensation valve in a loop where the highest load is located can be controlled to be completely opened through a two-position three-way electromagnetic valve so as to reduce pressure loss of a valve port, and the pressure is not affected by load fluctuation.

In order to achieve the-mentioned purpose, the present disclosure provides the following technical solution.

The present disclosure provides a flow control system for digital and mechanical redundant pressure compensation, including a first actuator hydraulic system. The first actuator hydraulic system comprises a pump, an electric motor, an oil tank, a first main valve, a first hydraulic cylinder, a first pressure sensor, a second pressure sensor, a fifth pressure sensor and a controller; a port A and a port B of the first main valve are connected with two chambers of the first hydraulic cylinder respectively, and a port T of the first main valve is connected with the oil tank; the controller obtains displacement data of a valve core of the first main valve and control a position of the valve core of the first main valve; the first pressure sensor and the second pressure sensor are configured for measuring pressures of the two chambers of the first hydraulic cylinder respectively, the fifth pressure sensor is configured for measuring a pressure of a port P of the first main valve, and the first pressure sensor, the second pressure sensor and the fifth pressure sensor are all electrically connected with the controller; the electric motor drives the pump to pump pressure oil in the oil tank to the port P of the first main valve.

The flow control system further includes a first pressure compensation structure; the first pressure compensation structure comprises a first two-position three-way electromagnetic valve and a first pressure compensation valve. A port A of the first two-position three-way electromagnetic valve is connected with a left control chamber of the first pressure compensation valve, a port T of the first two-position three-way electromagnetic valve is connected with the oil tank, a port P of the first two-position three-way electromagnetic valve and an oil outlet of the first pressure compensation valve are connected with the port P of the first main valve; an oil inlet of the first pressure compensation valve is connected with an oil outlet of the pump; and the first two-position three-way electromagnetic valve is electrically connected with the controller.

In some embodiments, the first main valve includes an electro-hydraulic proportional multi-way valve and a displacement sensor, the displacement sensor is connected with a valve core of the electro-hydraulic proportional multi-way valve, the controller is electrically connected with the electro-hydraulic proportional multi-way valve, and a port A, a port B, a port P and a port T of the electro-hydraulic proportional multi-way valve are respectively the port A, the port B, the port P and the port of the first main valve.

In some embodiments, the first main valve is an independent inlet and outlet control valve, the independent inlet and outlet control valve includes four two-position two-way flow valves electrically connected with the controller. The four two-position two-way flow valves includes a first two-position two-way flow valve, a second two-position two-way flow valve, a third two-position two-way flow valve and a fourth two-position two-way flow valve; a port A of the second two-position two-way flow valve is connected in parallel with a port A of the third two-position two-way flow valve to form die port P of the first main valve; a port A of the first two-position two-way flow valve is connected in parallel with a port B of the second two-position two-way flow valve to form the port A of the first main valve; a port B of the third two-position two-way flow valve is connected in parallel with a port A of the fourth two-position two-way flow valve to form the port B of the first main valve; and the port A of the first main valve is connected in parallel with the port B of the first main valve to form the port T of the first main valve.

In some embodiments, the two-position two-way flow valve is a direct-acting two-position two-way flow valve or a pilot-control two-position two-way flow valve.

In some embodiments, the flow control system further includes a second actuator hydraulic system, a second pressure compensation structure and a parallel system.

The second actuator hydraulic system further includes a second main valve, a second hydraulic cylinder, a third pressure sensor, a fourth pressure sensor, a sixth pressure sensor, a second pressure compensation structure and a second displacement sensor; a port A and a port B of the second main valve are connected with two chambers of the second hydraulic cylinder respectively, and a port T of the second main valve is connected with the oil tank; the third pressure sensor and the fourth pressure sensor are respectively configured for measuring pressures of the two chambers of the second hydraulic cylinder, the sixth pressure sensor is configured for measuring a pressure of a port P of the second main valve, and the third pressure sensor, the fourth pressure sensor and the sixth pressure sensor are all electrically connected with the controller; the electric motor drives the pump to pump the pressure oil in the oil tank to the port P of the second main valve.

The second pressure compensation structure includes a second two-position three-way electromagnetic valve and a second pressure compensation valve; a port A of the second two-position three-way electromagnetic valve is connected with a left control chamber of the second pressure compensation valve, a port T of the second two-position three-way electromagnetic valve is connected with the oil tank, a port P of the second two-position three-way electromagnetic valve and an oil outlet of the second pressure compensation valve are connected with the port P of the second main valve; an oil inlet of the second pressure compensation valve is connected with the oil outlet of the pump; the second two-position three-way electromagnetic valve is electrically connected with the controller.

The parallel system includes a first shuttle valve, a second shuttle valve, a third shuttle valve and a two-position two-way electromagnetic valve; two ends of the first shuttle valve are connected with the two chambers of the first hydraulic cylinder respectively; two ends of the second shuttle valve are respectively connected with the two chambers of the second hydraulic cylinder; an outlet of the first shuttle valve is connected with a left inlet of the third shuttle valve and a right control chamber of the first pressure compensation valve; an outlet of the second shuttle valve is connected with a right inlet of the third shuttle valve and a right control chamber of the second pressure compensation valve; an outlet of the third shuttle valve is connected with an inlet of the two-position two-way electromagnetic valve; and an outlet of the two-position two-way electromagnetic valve is connected with a control oil port of the pump.

In some embodiments, the flow control system further includes a safety valve, where an oil inlet of the safety valve is connected with the oil inlet of the first pressure compensation valve and the oil inlet of the second pressure compensation valve, and an oil outlet of the safety valve is connected with the oil tank.

In some embodiments, the pump is a variable pump, and the controller is electrically connected with the variable pump.

Compared with the prior art, the present disclosure has the following technical effects.

On the basis of an original pressure compensation valve, a two-position three-way electromagnetic valve is added to control opening and closing of the pressure compensation valve. Furthermore, a pressure sensor and a controller are added so that the flow control system has a digital pressure compensation function. When the pressure sensor breaks down, the flow control system is switched to a mechanical compensation mode to achieve mechanical pressure compensation of the flow control system, thereby solving the problem that the system flow cannot be controlled when the sensor breaks down, and achieving the purpose of redundancy control. Moreover, the pressure compensation valve in the loop where the highest load is located can be controlled to be completely opened through the two-position three-way electromagnetic valve to reduce pressure loss of a valve port, and the pressure is not affected by load fluctuation.

BRIEF DESCRIPTION OF THE DRAWINGS

To more clearly illustrate the embodiment of the present disclosure or the technical solution in the prior art, the following briefly introduces the accompanying drawings to be used in the embodiment. Apparently, the accompanying drawings in the following description show merely some embodiments of the present disclosure, and those skilled in the art may still derive other drawings from these accompanying drawings without paying creative efforts.

Figure 1:
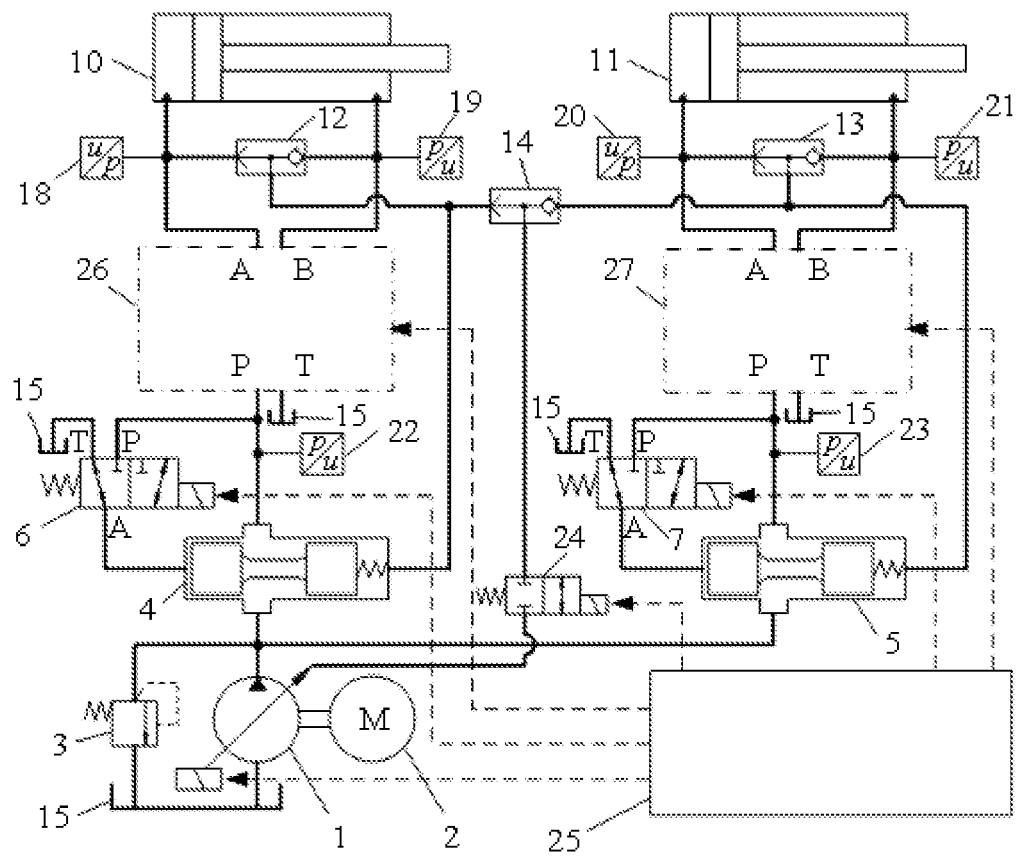
FIG. 1 is a schematic structural diagram of a flow control system for digital and mechanical redundant pressure compensation of a hydraulic system with two actuators.

Reference numerals: 1 pump; 2 electric motor; 3 safety valve; 4 first pressure compensation valve; 5 second pressure compensation valve; 6 first two-position three-way electromagnetic valve; 7 second two-position three-way electromagnetic valve; 8 electro-hydraulic proportional multi-way valve; 10 first hydraulic cylinder; II second hydraulic cylinder; 12 First shuttle valve; 13 second shuttle valve; 14 third shuttle valve; 15 oil tank; 16 displacement sensor; 18 first pressure sensor; 19 second pressure sensor; 20 third pressure sensor; 21 fourth pressure sensor; 22 fifth pressure sensor; 23 sixth pressure sensor; 24 two-position two-way electromagnetic valve; 25 controller; 26 first main valve; 27 second main valve; 28 first two-position two-way flow valve; 29 second two-position two-way flow valve; 30 third two-position two-way flow valve; and 31 fourth two-position two-way flow valve.

DETAILED DESCRIPTION OF THE EMBODIMENTS

The following clearly and completely describes the technical solutions in the embodiments of the present disclosure with reference to the accompanying drawings in the embodiments of the present disclosure. Apparently, the described embodiments are merely a part rather than all of the embodiments of the present disclosure. Based on the embodiments in the present disclosure, all other embodiments obtained by the ordinary technical persons in the art under the premise of without contributing creative labor belong to the scope protected by the present disclosure.

The present disclosure aims to provide a flow control system for digital and mechanical redundant pressure compensation. A pressure compensation structure is added to an actuator hydraulic system. Opening and closing of a pressure compensation valve is controlled through a two-position three-way electromagnetic valve to realize pressure compensation of the actuator hydraulic system pressure loss of the actuator hydraulic system is reduced and the pressure is not affected by load fluctuation.

To make the foregoing objectives, features and advantages of the present disclosure clearer and more comprehensible, the present disclosure is further described in detail below with reference to the accompanying drawings and specific embodiments.

Figure 2:
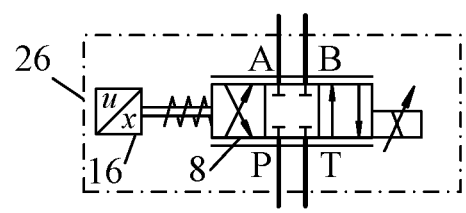
FIG. 2 is a schematic structural diagram of a first main valve or a second main valve.
Figure 3:
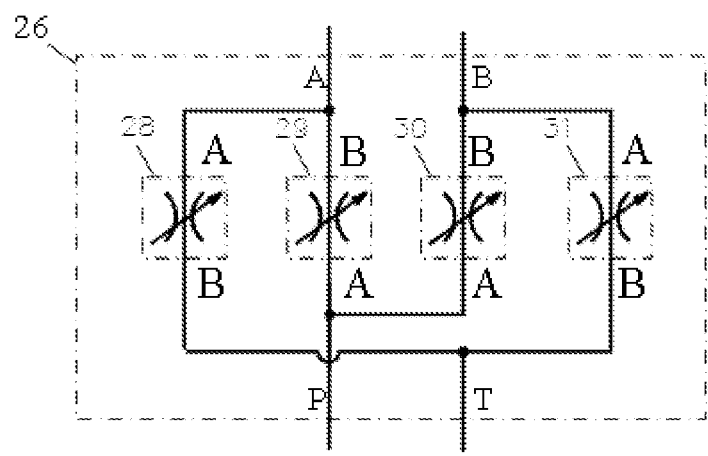
FIG. 3 is another schematic structural diagram of the first main valve or the second main valve.

As shown in FIG. 1 to FIG. 3, the embodiment provides a flow control system for digital and mechanical redundant pressure compensation. The flow control system includes a first actuator hydraulic system and a first pressure compensation structure.

The first actuator hydraulic system is a common hydraulic system in the prior art, and includes a pump 1, an electric motor 2, an oil tank 15, a first main valve 26, a first hydraulic cylinder 10, a first pressure sensor 18, a second pressure sensor 19, a fifth pressure sensor 22 and a controller 25. A port A and A port B of the first main valve 26 are connected with two chambers of the first hydraulic cylinder 10 respectively, and a port T of the first main valve 26 is connected with the oil tank 15. The controller 25 can obtain valve core displacement data of the first main valve 26 and control valve core position of the first main valve. The first pressure sensor 18 and the second pressure sensor 19 are used for measuring pressures of the two chambers of the first hydraulic cylinder 10 respectively, the fifth pressure sensor 22 is used for measuring a pressure of a port P of the first main valve 26, and the first pressure sensor 18, the second pressure sensor 19 and the fifth pressure sensor 22 are all electrically connected with the controller 25. The electric motor 2 drives the pump 1 to pump pressure oil in the oil tank 15 to the port P of the first main valve 26.

The first pressure compensation structure includes a first two-position three-way electromagnetic valve 6 and a first pressure compensation valve 4. A port A of the first two-position three-way electromagnetic valve 6 is connected with a left control chamber of the first pressure compensation valve 4, a port T of the first two-position three-way electromagnetic valve 6 is connected with the oil tank 15, a port P of the first two-position three-way electromagnetic valve 6 and an oil outlet of the first pressure compensation valve 4 are both connected with the port P of the first main valve 26. An oil inlet of the first pressure compensation valve 4 is connected with an oil outlet of the pump 1. The first two-position three-way electromagnetic valve 6 is electrically connected with the controller 25.

When digital pressure compensation is performed, the first two-position three-way electromagnetic valve 6 is not electrified at a left position. Valve ports of the first pressure compensation valve 4 are completely opened and not involved in work. The controller 25 realizes displacement correction based on the flow differential pressure change according to the obtained pressure data and the valve core displacement data, so that the disturbance of the load change on the flow is restricted, thereby ensuring the flow control accuracy.

When one or more of the first pressure sensor 18, the second pressure sensor 19 and the fifth pressure sensor 22 break down, a digital flow compensation mode is invalid, and the first pressure compensation valve 4 is involved in work to realize redundant control. Specifically, the controller 25 outputs an instruction to control the two-position three-way electromagnetic valve 6 to work at a right position, so that the left control chamber of the first pressure compensation valve 4 is communicated with the port P of the first main valve 26. A mechanical pressure compensator is involved in work, so that the pressure of the first main valve 26 behind is compensated, thereby realizing continuous and stable control of the flow.

Various types of the first main valve 26 can be selected by those skilled in the art according to the difference of actual needs.

As shown in FIG. 2, the first main valve 26 may include an electro-hydraulic proportional multi-way valve 8 and a displacement sensor 16. The displacement sensor 16 is connected with a valve core of the electro-hydraulic proportional multi-way valve 8. The controller 25 is electrically connected with the electro-hydraulic proportional multi-way valve 8. A port A, a port B, a port P and a port T of the electro-hydraulic proportional multi-way valve 8 are the port A, the port B, the port P and the port T of the first main valve 26 respectively. The controller 25 can obtain the valve core displacement data of the electro-hydraulic proportional multi-way valve 8 and output a control signal to control the valve core displacement of the electro-hydraulic proportional multi-way valve 8.

As shown in FIG. 3, the first main valve 26 can be an independent inlet and outlet control valve. The independent inlet and outlet control valve includes four two-position two-way flow valves electrically connected with the controller 25. The four two-position two-way flow valves are a first two-position two-way flow valve 28, a second two-position two-way flow valve 29, a third two-position two-way flow valve 30 and a fourth two-position two-way flow valve 31 respectively. The port A of the second two-position two-way flow valve 29 is connected in parallel with the port A of the third two-position two-way flow valve 30 to form the port P of the first main valve 26. The port A of the first two-position two-way flow valve 28 is connected in parallel with the port B of the second two-position two-way flow valve 29 to form the port A of the first main valve 26. The port B of the third two-position two-way flow valve 30 is connected in parallel with the port A of the fourth two-position two-way flow valve 31 to form the port B of the first main valve 26. The port A of the first main valve 26 is connected in parallel with the port B of the first main valve 26 to form the port T of the first main valve 26. As shown in FIG. 3, the two-position two-way flow valve can be a direct-acting two-position two-way flow valve or a pilot-control two-position two-way flow valve.

It needs be noted that the flow control system for digital and mechanical redundant pressure compensation in the embodiment may be provided with a single actuator hydraulic system or a plurality of actuator hydraulic systems.

FIG. 1 is a schematic structural diagram of the flow control system for digital and mechanical redundant pressure compensation with two actuator hydraulic systems. In FIG. 1, besides the above-mentioned first actuator hydraulic system and the above-mentioned first pressure compensation structure, the flow control system further includes a second actuator hydraulic system, a second pressure compensation structure and a parallel system.

Specifically, the second actuator hydraulic system further includes a second main valve 27, a second hydraulic cylinder 11, a third pressure sensor 20, a fourth pressure sensor 21, a sixth pressure sensor 23, a second pressure compensation structure and a second displacement sensor 16. A port A and a port B of the second main valve 27 are connected with two chambers of the second hydraulic cylinder 11 respectively, and a port T of the second main valve 27 is connected with the oil tank 15. The third pressure sensor 20 and the fourth pressure sensor 21 are respectively used for measuring pressures of the two chambers of the second hydraulic cylinder 11, the sixth pressure sensor 23 is used for measuring the pressure of the port P of the second main valve 27, and the third pressure sensor 20, the fourth pressure sensor 21 and the sixth pressure sensor 23 are all electrically connected with the controller 25. The electric motor 2 drives the pump 1 to pump the pressure oil in the oil tank 15 to the port P of the second main valve 27. The second main valve 27 can be in the form in FIG. 2 or FIG. 3, and also can be selectively in other forms according to needs.

The second pressure compensation structure includes a second two-position three-way electromagnetic valve 7 and a second pressure compensation valve 5. A port A of the second two-position three-way electromagnetic valve 7 is connected with a left control chamber of the second pressure compensation valve 5. A port T of the second two-position three-way electromagnetic valve 7 is connected with the oil tank 15. A port P of the second two-position three-way electromagnetic valve 7 and an oil outlet of the second pressure compensation valve 5 are both connected with the port P of the second main valve 27. An oil inlet of the second pressure compensation valve 5 is connected with the oil outlet of the pump 1. The second two-position three-way electromagnetic valve 7 is electrically connected with the controller 25.

The parallel system includes a first shuttle valve 12, a second shuttle valve 13, a third shuttle valve 14 and a two-position two-way electromagnetic valve 24. Two ends of the First shuttle valve 12 are respectively connected with two chambers of first hydraulic cylinder 10. Two ends of the second shuttle valve 13 are respectively connected with two chambers of the second hydraulic cylinder 11. An outlet of the first shuttle valve 12 is simultaneously connected with a left inlet of the third shuttle valve 14 and a fight control chamber of the first pressure compensation valve 4. An outlet or the second shuttle valve 13 is simultaneously connected with a right inlet of the third shuttle valve 14 and a right control chamber of the second pressure compensation valve 5. The outlet of the third shuttle valve 14 is connected with the inlet of the two-position two-way electromagnetic valve 24. The outlet of the two-position two-way electromagnetic valve 24 is connected with a control oil port of the pump 1.

When a plurality of actuator hydraulic systems work, the pressure compensation valve in the loop where the highest load pressure is located can be completely opened. When only one of the actuator hydraulic systems works, the pressure compensation valve in the actuator loop can be completely opened to further reduce the pressure loss.

In order to improve the safety, the flow control system further includes a safety valve 3, where the oil inlet of the safety valve 3 is simultaneously connected with the oil inlet of the first pressure compensation valve 4 and the oil inlet of the second pressure compensation valve 5, and the oil outlet of the safety valve 3 is connected with the oil tank 15.

Various types of the pump 1 can be selected by those skilled in the art according to the difference of actual needs. In the embodiment, the pump 1 is a variable pump, and the controller 25 is electrically connected with the variable pump. A tilt angle of the variable pump can be controlled through the controller 25.

Specific examples are used for illustration of the principles and implementation methods of the present disclosure. The description of the above-mentioned embodiments is used to help illustrate the method and the core principles or the present disclosure; and furthermore, those skilled in the art can make various modifications in terms or specific embodiments and scope or application in accordance with the teachings of the present disclosure. In conclusion, the content of this specification shall not be construed as a limitation to the present disclosure.

What is claimed is:

1. A flow control system for digital and mechanical redundant pressure compensation, comprising a first actuator hydraulic system, wherein the first actuator hydraulic system comprises a pump, an electric motor, an oil tank, a first main valve, a first hydraulic cylinder, a first pressure sensor, a second pressure sensor, a fifth pressure sensor and a controller; a port A and a port B of the first main valve are connected with two chambers of the first hydraulic cylinder respectively, and a port T of the first main valve is connected with the oil tank; the controller obtains displacement data of a valve core of the first main valve and control a position of the valve core of the first main valve; the first pressure sensor and the second pressure sensor are configured for measuring pressures of the two chambers of the first hydraulic cylinder respectively, the fifth pressure sensor is configured for measuring a pressure of a port P of the first main valve, and the first pressure sensor, the second pressure sensor and the fifth pressure sensor are all electrically connected with the controller; the electric motor drives the pump to pump pressure oil in the oil tank to the port P of the first main valve;

wherein the flow control system further comprises a first pressure compensation structure; the first pressure compensation structure comprises a first two-position three-way electromagnetic valve and a first pressure compensation valve; a port A of the first two-position three-way electromagnetic valve is connected with a left control chamber of the first pressure compensation valve, a port T of the first two-position three-way electromagnetic valve is connected with the oil tank, a port P of the first two-position three-way electromagnetic valve and an oil outlet of the first pressure compensation valve are connected with the port P of the first main valve; an oil inlet of the first pressure compensation valve is connected with an oil outlet of the pump; and the first two-position three-way electromagnetic valve is electrically connected with the controller;

wherein the first main valve is an independent inlet and outlet control valve, the independent inlet and outlet control valve comprises four two-position two-way flow valves electrically connected with the controller, and the four two-position two-way flow valves comprise a first two-position two-way flow valve, a second two-position two-way flow valve, a third two-position two-way flow valve and a fourth two-position two-way flow valve; a port A of the second two-position two-way flow valve is connected in parallel with a port A of the third two-position two-way flow valve to form the port P of the first main valve; a port A of the first two-position two-way flow valve is connected in parallel with a port B of the second two-position two-way flow valve to form the port A of the first main valve; a port B of the third two-position two-way flow valve is connected in parallel with a port A of the fourth two-position two-way flow valve to form the port B of the first main valve; and the port A of the first main valve is connected in parallel with the port B of the first main valve to form the port T of the first main valve.

2. The flow control system according to claim 1, wherein the first main valve comprises an electro-hydraulic proportional multi-way valve and a displacement sensor, the displacement sensor is connected with a valve core of the electro-hydraulic proportional multi-way valve, the controller is electrically connected with the electro-hydraulic proportional multi-way valve, and a port A, a port B, a port P and a port T of the electro-hydraulic proportional multi-way valve are respectively the port A, the port B, the port P and the port T of the first main valve.

3. The flow control system according to claim 1, wherein the two-position two-way flow valve is a direct-acting two-position two-way flow valve or a pilot-control two-position two-way flow valve.

4. The flow control system according to claim 1, further comprising a second actuator hydraulic system, a second pressure compensation structure and a parallel system, wherein the second actuator hydraulic system further comprises a second main valve, a second hydraulic cylinder, a third pressure sensor, a fourth pressure sensor, a sixth pressure sensor, a second pressure compensation structure and a second displacement sensor; a port A and a port B of the second main valve are connected with two chambers of the second hydraulic cylinder respectively, and a port T of the second main valve is connected with the oil tank; the third pressure sensor and the fourth pressure sensor are respectively configured for measuring pressures of the two chambers of the second hydraulic cylinder, the sixth pressure sensor is configured for measuring a pressure of a port P of the second main valve, and the third pressure sensor, the fourth pressure sensor and the sixth pressure sensor are all electrically connected with the controller; the electric motor drives the pump to pump the pressure oil in the oil tank to the port P of the second main valve;

the second pressure compensation structure comprises a second two-position three-way electromagnetic valve and a second pressure compensation valve; a port A of the second two-position three-way electromagnetic valve is connected with a left control chamber of the second pressure compensation valve, a port T of the second two-position three-way electromagnetic valve is connected with the oil tank, a port P of the second two-position three-way electromagnetic valve and an oil outlet of the second pressure compensation valve are connected with the port P of the second main valve;

an oil inlet of the second pressure compensation valve is connected with the oil outlet of the pump; the second two-position three-way electromagnetic valve is electrically connected with the controller;

the parallel system comprises a first shuttle valve, a second shuttle valve, a third shuttle valve and a two-position two-way electromagnetic valve; two ends of the first shuttle valve are connected with the two chambers of the first hydraulic cylinder respectively; two ends of the second shuttle valve are respectively connected with the two chambers of the second hydraulic cylinder; an outlet of the first shuttle valve is connected with a left inlet of the third shuttle valve and a right control chamber of the first pressure compensation valve; an outlet of the second shuttle valve is connected with a right inlet of the third shuttle valve and a right control chamber of the second pressure compensation valve; an outlet of the third shuttle valve is connected with an inlet of the two-position two-way electromagnetic valve; and an outlet of the two-position two-way electromagnetic valve is connected with a control oil port of the pump.

5. The flow control system according to claim 4, further comprising a safety valve, wherein an oil inlet of the safety valve is connected with the oil inlet of the first pressure compensation valve and the oil inlet of the second pressure compensation valve, and an oil outlet of the safety valve is connected with the oil tank.

6. The flow control system according to claim 1, wherein the pump is a variable pump, and the controller is electrically connected with the variable pump.

\* \* \* \* \*